April 21, 1959  B. A. DLUGI  2,882,858
SANITARY APPLIANCE FOR BIRDS
Filed Oct. 15, 1956
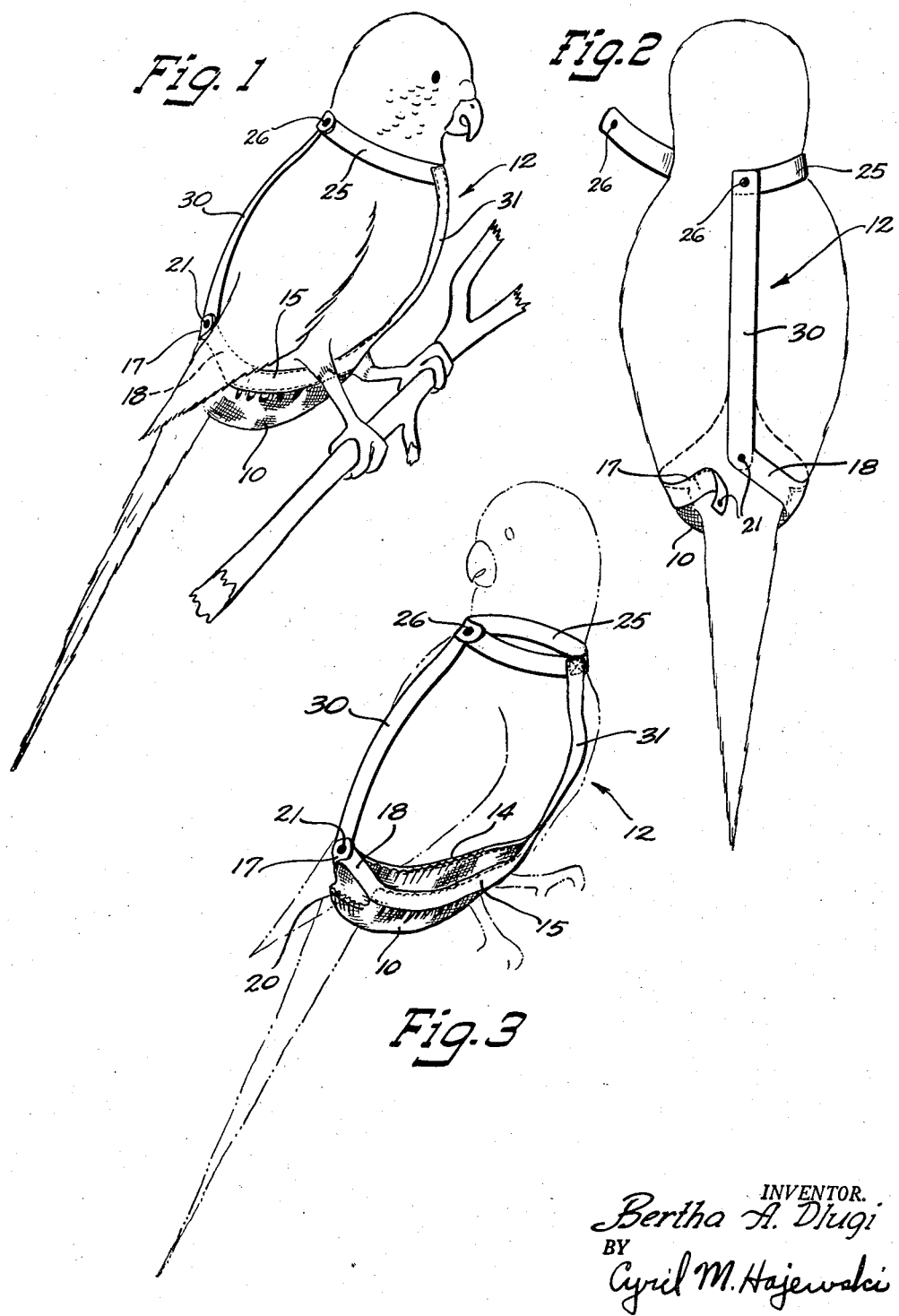
INVENTOR.
Bertha A. Dlugi
BY
Cyril M. Hajewski
Attorney

United States Patent Office 2,882,858
Patented Apr. 21, 1959

2,882,858

SANITARY APPLIANCE FOR BIRDS

Bertha A. Dlugi, Milwaukee, Wis.

Application October 15, 1956, Serial No. 615,864

5 Claims. (Cl. 119—143)

This invention relates generally to a garment to be worn by birds and more particularly to a garment having a patch of material especially adapted to be supported about the crissum of a bird for the purpose of receiving its excremental discharge.

The practice of maintaining parakeets and similar birds as household pets has gained in popularity. The popularity of this type of bird is partially due to its unique characteristics which permit it to be granted the freedom of the house, and they are usually allowed to fly about all or some of the rooms of the home at times. A distinct disadvantage in this practice is that these birds cannot normally be house trained as other pets are, and their excremental discharge is frequently deposited on household furnishings when they are at liberty, creating an unsanitary condition.

It is therefore a general object of the present invention to provide a garment to be worn by birds for receiving their excremental discharge to prevent it from being deposited on household furnishings when the bird is at liberty in the home and thereby avoid the consequent unsanitary condition.

Another object of the present invention is to provide a sanitary garment that may be worn by birds without being a source of annoyance to the bird.

Another object is to provide a sanitary garment for birds that is extremely light in weight and that may be worn by a bird without hampering its movement in any way.

Another object is to provide a sanitary garment for birds that is inconspicuous when worn by a bird by reason of the fact that a substantial portion of it becomes concealed by the feathers of the bird.

A further object is to provide a sanitary garment for birds that may be readily placed on the bird without harming the bird in any way.

A still further object is to provide a sanitary garment for birds that is of simple and inexpensive construction but efficiently serves its purpose.

According to the present invention the improved sanitary garment comprises a triangular patch of material adapted to be supported about the crissum of the bird for receiving its excremental discharge. The patch is preferably in the form of an isosceles triangle that is supported by a harness formed of strips of tape. One of these strips of tape extends over the base of the bird's tail and another strip of tape is attached to the apex of the triangle, extending upwardly therefrom along the breast of the bird for attachment to a neck band that encircles the neck of the bird. The harness is completed by another strip of tape extending along the bird's back, being attached at one end to the neck band and at its opposite end to the tape disposed on the top of the tail of the bird. Thus, the harness firmly supports the patch of material in position to perform its function. The several strips of tape are of a relatively narrow width, and after the harness has been placed upon the bird the bird will invariably ruffle its feathers causing them to overlie the strips of tape and thereby effectively conceal them. A length of elastic is provided along the base of the triangular patch to draw this portion of the patch together for the purpose of yieldably drawing the slack about the base of the bird's tail and at the same time causing the central portion of the body of the patch to sag and thereby create a pouch for receiving the excremental discharge.

The foregoing and other objects of the invention, which will become more fully apparent from the following detailed description, may be achieved by means of the article described in connection with the accompanying drawings in which:

Figure 1 is a perspective view of a bird wearing a sanitary garment that is constructed in accordance with the teachings of the present invention;

Figure 2 is a view of the back of a bird wearing the sanitary garment illustrated in Figure 1, with the two snap fasteners of the sanitary garment being unfastened to show the method employed for securing the garment on the bird; and Figure 3 is a perspective view of the sanitary garment of the present invention, similar to the view in Figure 1 but with the bird being outlined by broken lines only, so that it does not interfere with the illustration of the complete construction of the garment.

Reference is now made more particularly to the drawings which illustrate the improved sanitary garment of the present invention being worn by bird. The bird is illustrated in the drawing as a parakeet inasmuch as the garment is especially suitable for this type of bird by reason of the characteristics of this species of bird which render it popular as a domestic pet, and particularly the fact that it is frequently released from the confines of its cage and is granted the liberty of the home of its owner. The improved sanitary garment of the present invention is particularly useful in those instances where the bird is given the freedom of the home, or portions of it, to prevent the bird's excremental discharge from being deposited upon the household furnishings and thereby avoid the consequential unsanitary conditions.

The improved bird garment of the present invention comprises a triangular patch 10 that is preferably formed of an adsorbent cloth which will absorb the liquid portion of the discharge and permit it to evaporate. The triangular patch 10 is supported on the underside of the bird to cover its crissum by a harness generally identified by the reference numeral 12. The anatomy of birds is such that they are provided with a common chamber called the cloaca for receiving the waste material from both the intestinal and urinary canals. The bird discharges this waste material from the cloaca through its cloacal opening which is surrounded by the crissum. Thus, by providing a small patch of material 10 to cover the crissum of the bird, the patch 10 will receive the excremental discharge from both the intestinal and urinary canals.

The patch 10 is preferably in the form of an isosceles triangle with a length of tape forming a strap member 14 sewn along the entire length of one of its equal sides and another length of tape forming a strap member 15 sewn along its opposite equal side. The strap members 14 and 15 are longer than the length of the associated sides of the triangular patch 10 so that the strap member 14 includes an extension 17 which extends beyond the end of the side of the patch 10, and the strap member 15 likewise includes an extension 18 which similarly extends beyond its associated side of the triangular patch 10.

The two equal sides of the triangular patch 10 are preferably pleated at the seams which join them with the strap members 14 and 15 respectively for the purpose of creating a fullness in the patch 10 to cause it to sag at its central portion in the manner of a pouch for the purpose of establishing its capacity to receive the excremental discharge of the bird. Such pouch effect is further developed by the inclusion of an elastic thread 20 that is weaved through the material at the base of the triangle formed by the patch 10 to yieldably draw the ends of the base of the triangle toward each other and thereby likewise form small pleats along the length of the base of the triangle.

In operation, the base of the triangular patch 10 is disposed underneath the base of the tail of the bird while the extensions 17 and 18 are fastened together on the top of the base of the tail to secure the lower portion of the patch 10 to the tail of the bird. The extensions 17 and 18 are short enough so that it is necessary to stretch the elastic 20 slightly in order to attach the ends of the extensions 17 and 18 together, although the base of the triangle is not extended its entire length so that the pleats in this length of material are not entirely eliminated. With this arrangement, the elastic thread 20 serves not only to impart a fullness to the patch 10 to obtain the pouch effect, but it also serves to draw the base of the triangular patch 10 gently but firmly about the tail of the bird to obtain an accurate fit. The free ends of the extensions 17 and 18 are coupled to each other by a suitable fastener 21, the well known snap fastener being ideally suited for this purpose with one portion of the snap fastener 21 being secured to the end of the extension 17 and its cooperating portion being secured to the end of the extension 18 as clearly shown in Figure 2.

The harness 12 serves to prevent the base of the triangular patch 10 and its associated extensions 17 and 18 from sliding down the tail of the bird and supports the apex of the triangular patch 10 along the breast of the bird. The harness 12 includes a neck band or collar member 25 of sufficient length to snugly encircle the neck of the bird, the neck band being provided with a snap fastener 26 for connecting its ends together to retain it about the neck of the bird. One portion of the snap fastener 26 is mounted on one end of the neck band 25 and its cooperating portion is mounted on the opposite end of the neck band 25. Other types of fasteners may be employed for this purpose but it has been found that the common snap fastener functions very efficiently and is convenient to operate. The neck band 25 is of the proper length to fit snugly about the neck of the bird without causing the bird any discomfort and serves to support the patch 10 in position about the crissum of the bird by means of a back member or strap 30 and a breast member or strap 31.

The breast strap 31 is attached at one end to the neck band 25 intermediate the ends of the neck band 25 so that it is located along the breast of the bird when the neck band is fastened in position with its two ends joined at the back of the neck. The breast strap 31 extends downwardly along the breast of the bird from its point of attachment to the neck band 25 and its opposite end is secured to the apex of the triangle formed by the patch 10. It is apparent therefore that the breast strap 31 in cooperation with the neck band 25 serves to support the apex of the patch 10 to retain the latter in the proper position about the crissum of the bird.

The back strap 30 functions similarly to retain the base portion of the triangle formed by the patch 10 in the proper position, and is attached at one end to an end of the neck band 25 and at its opposite end to an end of either the extension 17 or the extension 18, it being shown attached to the extension 18 in the drawings. Although the back strap 30 may be attached to either the end of the extension 17 or the end of the extension 18, it is essential that it be attached to the end of the extension which is on the same side of the bird that the end of the neck band to which it is attached is located. Thus, in Figure 2, the back strap 30 is shown attached to the extension 18 which is on the right side of the bird, and it is therefore attached to the right end of the neck band 25. Such arrangement is essential so that the harness may be fully opened to permit it to be placed on the bird.

To apply the garment to the bird it is only necessary to insert one leg of the bird through the large opening defined by the neck band 25, the straps 30 and 31, the extension 18 and the tape 15 which is sewn to one side of the patch 10. The back strap 30 is then positioned along the back of the bird while the neck band 25 is brought about the neck of the bird, and the two portions of the snap fasteners 26 are connected together to secure the neck band 25 in position about the neck of the bird. In like manner, the base of the triangular patch 10 is brought underneath the base of the tail of the bird and the extensions 17 and 18 are placed over the top of the tail. The two cooperating portions of the snap fastener 21 are then connected together to thereby couple the end of the extension 17 to the end of the extension 18 at the top of the tail of the bird for supporting the base of the patch 10 in position underneath the tail of the bird. Because of the length of the extensions 17 and 18 the elastic thread 20 is stretched slightly when the ends of the extensions are coupled, causing the base of the triangle formed by the patch 10 to gently cling to the underside of the tail.

The view in Figure 2 illustrates the position of the harness before the cooperating portions of the snap fasteners 21 and 26 are connected together. When these are connected to their cooperating portions as shown in Figures 1 and 3, the harness 12 functions to efficiently support the patch of material 10 about the crissum of the bird so that it may perform its function of receiving the excremental discharge. The entire garment is therefore conveniently fastened to the bird in the proper position by the operation of two simple snap fasteners.

The back strap 30, the breast strap 31, the neck band 25, and the extensions 17 and 18 are all formed of narrow widths of tape and it has been found that invariably after the garment has been placed on the bird, the bird will ruffle its feathers and cause them to cover the several strips of tape so that the garment becomes inconspicuous and is noticeable only when the bird is closely examined. It therefore does not detract from the beauty of the bird which is an important factor in view of the colorful appearance of the species of birds that are permitted the freedom of the home.

From the foregoing detailed description of the structure and operation of the illustrative embodiment of the present invention, it will be apparent that there has been provided a new and improved sanitary garment for birds that is especially adapted to be conveniently placed upon the bird and comfortably worn by it for the purpose of receiving the excremental discharge of the bird to thereby avoid the unsanitary conditions which may exist, particularly when the bird is at liberty in a dwelling.

Although the illustrative embodiment of the invention has been described in considerable detail for the purpose of making a full disclosure of a practical operative structure by means of which the invention may be practised, it is to be understood that various novel features of the invention may be incorporated in other structural forms without departing from the spirit and scope of the invention as defined in the subjoined claims.

The principles of the invention having now been fully explained in connection with the foregoing description of embodying structure, I hereby claim as my invention:

1. In a sanitary appliance to be worn by birds for receiving their excremental discharge; a collar member to encircle the neck of the bird; a back member having an upper end and a lower end with said upper end being attached to said collar member; a breast member having a forward portion and a rearward portion with its forward portion being attached to said collar member; a pair of intersecting strap members, each of said strap members having one end attached to said rearward portion of said breast member with the opposite ends of said strap members being attached to said lower portion of said back member; and a patch attached to a portion of the length of said strap members and having a tail engaging portion spaced from the juncture of said two strap members with said lower end of said back member; whereby said patch will be supported by said members about the cloacal opening of the bird to receive its excremental discharge.

2. The sanitary appliance of claim 1 in which said tail engaging portion is elastic which can be stretched along the underside of the tail of the bird to obtain a snug engagement.

3. The sanitary appliance of claim 1 in which said patch is formed of absorbent cloth.

4. The sanitary appliance of claim 3 in which said back member and said breast member are formed of flexible tape.

5. The sanitary appliance of claim 4 in which a collar fastener is attached to the two ends of said collar member and is operable to connect the ends of said collar member together for securing said collar member about the neck of the bird; and including removable joining means for joining the two ends of said tail straps with said lower portion of said back member at the top side of the tail of the bird for supporting said tail engaging portion at the underside of the tail of the bird.

References Cited in the file of this patent

UNITED STATES PATENTS

| | | |
|---|---|---|
| 198,282 | Dowling | Dec. 18, 1877 |
| 1,251,886 | Hawkins | Jan. 1, 1918 |
| 2,190,115 | Fuqua | Feb. 13, 1940 |
| 2,703,553 | Cooke | Mar. 8, 1955 |

FOREIGN PATENTS

| | | |
|---|---|---|
| 683,622 | France | June 16, 1930 |